June 5, 1962  R. L. AMANS  3,037,938
RESISTANCE TO DEPRECIATION OF ELECTROLUMINESCENT PHOSPHORS
Filed Jan. 4, 1960
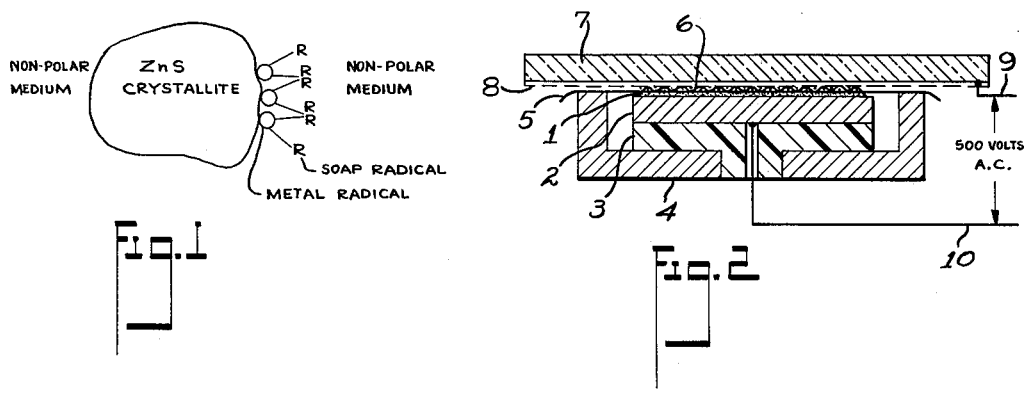
Fig.1
Fig.2
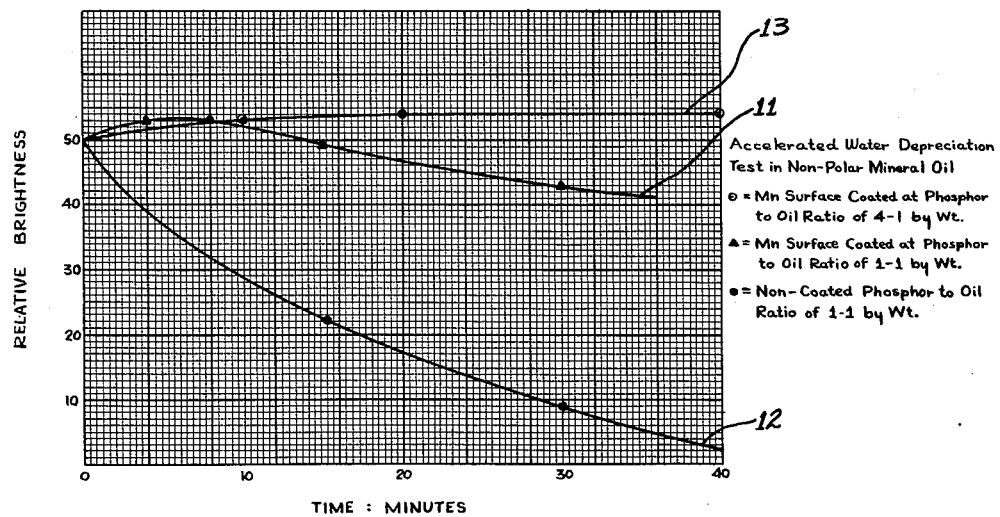
Fig.3
INVENTOR.
Robert L. Amans
BY
Attorney 3,037,938
RESISTANCE TO DEPRECIATION OF ELECTRO-
LUMINESCENT PHOSPHORS
Robert L. Amans, Lyndhurst, Ohio, assignor to General
Electric Company, a corporation of New York
Filed Jan. 4, 1960, Ser. No. 166
3 Claims. (Cl. 252—301.3)

This invention relates generally to electroluminescent phosphors and more particularly to a method of treating such phosphors to improve their resistance to water-depreciation.

In a water-free environment, the depreciation of electroluminescent phosphors has generally been observed to occur faster in dispersions in polar dielectrics than in non-polar dielectrics. In a high humidity environment, phosphors depreciate rapidly in both polar and non-polar dielectrics due to diffusion of the highly polar water to the phosphor surfaces.

The principal object of the invention is to provide electroluminescent phosphors having improved maintenance particularly with regards to resistance to water depreciation, and to provide convenient treatments for achieving these results.

Another object of the invention is to provide a treatment for electroluminescent phosphors which will improve their resistance to water depreciation but without loss of brightness as a result of the treatment.

Yet a further object of the invention is to improve the brightness of dispersions of electroluminescent phosphors in dielectric media.

The present treatment was developed primarily for use in non-polar or low polarity dielectrics such as hydrocarbons or symmetrically halogenated hydrocarbon dielectrics. As a result of the treatment, the superior maintenance of electroluminescent phosphors in non-polar dielectrics can be further improved, especially in the presence of high humidity. Also as a result of this treatment a greater phosphor-to-dielectric volume ratio can be obtained due to increased wettability of the treated phosphor. The increased phosphor-to-dielectric volume ratio results in improved brightness as well as improved resistance to depreciation.

Further advantages of the invention will become apparent from the following detailed description including examples. The features believed to be novel will be more particularly pointed out in the appended claims.

In the drawing:
FIG. 1 is a picturization of a surface-coated phosphor crystallite according to the invention.
FIG. 2 illustrates schematically a set-up for accelerated water depreciation testing of phosphor dispersions.
FIG. 3 compares graphically the maintenance characteristics of electroluminescent phosphors treated according to the invention, with another not so treated.

The following is a working hypothesis of the mechanism of electroluminescent phosphor depreciation when immersed in, or in contact with, polar media which led to the making of this invention. Taking electroluminescent zinc sulfide for example, depreciation in polar media leads to decomposition of ZnS into free zinc and sulfur. The reactions taking place initially are the formation of solvated $Zn^{++}$ and $S^{=}$ ions. Usually water is the polar ionizing medium which causes formation of the solvated ions. However, other polar ionizing media can also form nonaqueous solvated ions. The reactions are as follows:

$$ZnS + \text{adsorbed polar molecules} \rightarrow Zn^{++} + S^{=}$$
$$2e^{-} + Zn^{++} \rightarrow Zn\downarrow$$
$$2e^{+} + S^{=} \rightarrow S\downarrow$$

The adsorbed polar molecule may be water or other polar ionizing molecule capable of forming aqueous or non-aqueous solvated ions. The above reactions are believed to take place only at the surface of the ZnS crystallite.

It is postulated that:
(1) The start of the reaction is due to adsorbed polar molecules capable of producing solvated ions. If the adsorbed ionizing polar molecules present can be eliminated or reduced in number, then the depreciation can be prevented or retarded.
(2) The completion of the reaction is due to the presence of electrons and holes (vacant electron sites) which have been produced on the surface as a result of the electroluminescent excitation process. If the number of electrons and holes available to the $Zn^{++}$ and $S^{=}$ ions can be eliminated or reduced, then the depreciation can be prevented or retarded.

In accordance with the invention, I have determined that resistance to water depreciation can be very substantially improved by providing on the phosphor crystallites surface coatings of metallic soaps of vanadium, chromium, manganese, iron, cobalt and nickel. Metallic soaps are defined as metal salts or soaps of organic carboxylic acids and metals. These metallic soaps are known commercially as naphthenates, 2-ethyl-hexoates, oleates, linoleates and tallates.

On the basis of the previous postulates, the organic radical, oriented into the non-polar hydrocarbon media, presents a hydrophobic or water-repelling surface and the V, Cr, Mn, Fe, Co and Ni ions provide the recombination centers for electrons and holes. The method of providing these recombination centers at the surface and also of producing a water repelling surface involves coating the phosphor by dispersing it in a non-polar medium containing the metal soaps. By adsorption processes the metallic component is attached to the surface of the ZnS and the organic soap radical is oriented into the non-polar medium. This is illustrated in FIG. 1 showing a ZnS crystallite in a non-polar medium with attached metal soap molecules. When the entire crystallite is coated, the organic soap radicals present a hydrophobic surface to all aspects.

Phosphors so treated with these adsorbed coatings show little or no loss in brightness and a very decided improvement in resistance to depreciation by water. In accelerated tests, wherein water is diffused into an electroluminescent device, the treated phosphors have shown a fourfold improvement over a non-treated phosphor.

It is desired to emphasize that the invention provides a coating of V, Cr, Mn, Fe, Co and Ni recombination centers at the surface only of the phosphor crystals such as zinc sulfide. Nickel and similar materials are basically "killers" of luminescence and when present even slightly within surface layers will destroy the surface luminescence and reduce the overall luminescence. By providing adsorbed coatings which do not diffuse into the phosphor, the luminescence of the surface is not affected. In this respect, the present invention may be regarded as an improvement over that described and claimed in copending application Serial No. 784,940, filed January 5, 1959, of Ralph M. Potter and Manuel Aven, entitled Electroluminescent Phosphor and Treatment, and assigned to the same assignee as the present invention. At the same time, the treatment according to this invention results in a protective shell about the phosphor crystallites which provides the desired recombination centers.

The improvements in maintenance or resistance to water-depreciation achieved by the invention are not restricted to one particular phosphor; doubtless this is due to the fact that the treatment results in a surface coating. For instance, zinc selenide, zinc sulfo-selenide, and cadmium sulfide or selenide may likewise be treated. In general it appears that any electroluminescent phosphor wherein excitation may cause decomposition of the crystallites in a manner similar to that postulated for ZnS, will benefit from the metallic soap treatment of the invention.

The most straightforward method of treating the phosphor is to wash it in a solution containing an excess of the metallic soap in a non-polar solvent. The phosphor crystallites adsorb on their exposed surfaces whatever quantity of metallic soap is required to effect the surface coating. The excess metallic soap is then washed off and the phosphor is then if desired dispersed in a solution of a non-polar dielectric and cast as a thin film or layer on a suitable base. Examples of suitable non-polar or low-polarity dielectrics or resins are polystyrene, polyethylene and tetrafluoropolyethylene.

An alternative method of treatment which offers the advantage of economy in quantity production is to add the metallic soap to the non-polar dielectric solution, for instance to a solution of polystyrene in toluene in which the phosphor is dispersed prior to casting as a thin film or layer. In such case of course the quantity of metallic soap added must be adjusted with respect to the metallic soap adsorbing capacity of the phosphor to insure that an excess of unadsorbed metallic soap does not remain behind in the dielectric with deleterious consequences. The metallic soap adsorbing capacity of the phosphor will depend of course upon its nature and also upon the particle size of the phosphor crystallites.

The following are examples of phosphors treated in accordance with the invention to improve the maintenance characteristics.

*Example 1—Manganese*

Ten grams of zinc sulfide activated with copper and chlorine (ZnS:Cu, Cl) green electroluminescent phosphor were dispersed in 5 cc. of manganese naphthenate containing 1% Mn. After thorough dispersion the slurry was filtered and washed with a non-polar solvent such as toluene or mineral spirits to remove non-adsorbed excess manganese naphthenate. The coated phosphor was dried in an oven at 120° C. The temperature can be as high as 350° C. and is preferably in the range of 100–250° C.

This treated phosphor, which contains more than 10 parts per million of Mn but less than 100 p.p.m., was then tested for resistance to water depreciation along with other untreated phosphors for purposes of comparison.

Accelerated tests were made using the apparatus illustrated in FIG. 2 which may be regarded as a form of demountable electroluminescent lamp. A thin film or layer 1 of a phosphor in a nonpolar fluid dispersion, suitably a petroleum base mineral oil is placed on a metal electrode 2 resting on an insulator 3 within a shallow cup 4. A thin sheet 5 of plastic which will allow penetration by moisture is placed on top of the phosphor-dielectric film; a ¼ mil thick film of polyethylene terephthalate (DuPont mylar) is suitable. A piece of absorbent glass paper 6 saturated with a measured amount of water is then placed on top of the plastic film 5. The whole assembly is then covered by a conductive transparent electrode which may consist of a glass plate 7 having a conductive coating 8 of tin oxide on its underside. The device is energized by applying alternating voltage between conductor 9 connected to the transparent electrode 8 and conductor 10 connected to metal electrode 2.

The phosphor-dielectric oil films were tested for maintenance by operating them at 60 cycles per second and 40,000 R.M.S. volts per centimeter corresponding to an applied potential of approximately 500 volts. Brightness of the phosphor was determined by measuring the light transmitted through glass plate 7.

Comparative results for the phosphor treated in accordance with Example 1 are shown in FIG. 3. Curve 11 shows the accelerated maintenance characteristic for the manganese naphthenate treated phosphor whereas curve 12 shows the corresponding characteristic for the nontreated phosphor. In both cases the phosphor to dielectric weight ratio was 1 to 1. It will be observed that after 30 minutes operation, the treated phosphor shows a brightness in excess of 4 times greater than that of the nontreated phosphor.

An unexpected advantage of the metallic soap treatment in accordance with the invention is the higher ratio of phosphor to dielectric which it makes possible in a given dielectric resin dispersion. This appears to be due to the improved wettability of the treated phosphor and results not only in a higher brightness but also in better maintenance. This is illustrated in FIG. 3 by curve 13 showing the depreciation characteristic of the same manganese treated phosphor in a phosphor to dielectric oil ratio of 4 to 1 by weight. It will be noted that the brightness at 30 minutes is about 30% better than that of the treated phosphor in a 1 to 1 phosphor to dielectric oil ratio.

While the foregoing tests have been conducted with a phosphor in a nonpolar mineral oil dispersion in order to obtain results quickly, more conventional tests, some of which have reached the 1000 hour stage, confirm these results. In these tests, the phosphors are dispersed in solid dielectric resins such as polystyrene and a corresponding pattern of long range improvement in maintenance as a result of the metallic soap treatment has been observed. The further improvement in maintenance and brightness due to the higher phosphor to dielectric resin ratio made possible by the invention has also been observed.

*Example 2—Cobalt*

Ten grams of ZnS:Cu, Cl phosphor were dispersed in 5 cc. of cobalt naphthenate containing 1% Co. After thorough dispersion the slurry was filtered and washed with a nonpolar solvent such as toluene or mineral spirits to remove nonadsorbed excess cobalt naphthenate. The coated phosphor was dried in an oven at 120° C. This treated phosphor, which contained less than 100 p.p.m. but more than 10 p.p.m. of Co, was tested for resistance to accelerated water depreciation in the manner previously described and it was found to depreciate to 80% of initial brightness after 30 minutes.

*Example 3—Nickel*

Ten grams of ZnS:Cu, Cl phosphor were dispersed in 5 cc. of nickel naphthenate containing 1% Ni. After thorough dispersion the slurry was filtered and washed with a nonpolar solvent such as toluene or mineral spirits to remove nonadsorbed excess nickel naphthenate. The coated phosphor was dried in an oven at 120° C. This treated phosphor, which contained less than 1000 p.p.m. but greater than 100 p.p.m. of Ni, was tested for resistance to accelerated water depreciation in the manner previously described and found to depreciate to 80% of initial brightness after 30 minutes.

*Example 4—Vanadium*

Ten grams of ZnS:Cu, Cl phosphor were dispersed in 5 cc. of vanadium naphthenate containing 1% V. After thorough dispersion the slurry was filtered and washed with a nonpolar solvent such as toluene or mineral spirits to remove nonadsorbed excess vanadium naphthenate. The coated phosphor was dried in an oven at 120° C. This treated phosphor was tested for resistance to accelerated water depreciation by the method previously described and found to depreciate to 71% of initial brightness after 30 minutes.

*Example 5—Iron*

Ten grams of ZnS:Cu, Cl phosphor were dispersed in 5 cc. of iron naphthenate containing 1% Fe. After thorough dispersion the slurry was filtered and washed with a nonpolar solevnt such as toluene or mineral spirits to remove nonadsorbed excess iron naphthenate. The coated phosphor was dried in an oven at 120° C. This treated phosphor was tested for resistance to accelerated water depreciation in the manner previously described and found to depreciate to 66% of initial brightness after 30 minutes.

*Example 6—Chromium*

Ten grams of ZnS:Cu, Cl phosphor were dispersed in 5 cc. of chromium oleate containing 1% Cr. After thorough dispersion the slurry was filtered and washed with a non-polar solvent such as toluene or mineral spirits to remove nonadsorbed excess chromium oleate. The coated phosphor was dried in an oven at 120° C. This treated phosphor was tested for resistance to accelerated water depreciation in the manner previously described and found to depreciate to 52% of initial brightness after 30 minutes.

The following table summarizes the results of the accelerated water depreciation tests.

TABLE I

| | Brightness after 30 minutes as a percent of initial |
|---|---|
| Control nontreated ZnS:Cu, Cl | 20 |
| Manganese naphthenate treated | 81 |
| Cobalt naphthenate treated | 80 |
| Nickel naphthenate treated | 80 |
| Vanadium naphthenate treated | 71 |
| Iron naphthenate treated | 66 |
| Chormium oleate treated | 52 |

It will be observed from the table that the metal soaps all give substantial improvements in maintenance and that the best results are obtained with manganese, cobalt and nickel soaps.

The specific examples of embodiments of the invention which have been given herein are intended as illustrative and not as limitative of the invention whose scope is to be determined by the appended claims.

What I claim as new and desire to secure by Letters Patent of the United States is:

1. An electroluminescent phosphor having improved maintenance characteristics consisting essentially of phosphor crystallites from the group consisting of the sulfides and selenides of zinc and cadmium coated with a surface layer of a metallic soap from the group consisting of the naphthenates, 2-ethyl-hexoates, oleates, linoleates and tallates of vanadium, chromium, manganese, iron, cobalt and nickel.

2. An electroluminescent phosphor as defined in claim 1 wherein the phosphor is dispersed in a high phosphor to dielectric ratio in a nonpolar dielectric.

3. A process for improving the resistance to water depreciation of an electroluminescent phosphor from the group consisting of the sulfides and selenides of zinc and cadmium comprising reacting the phosphor with a metallic soap from the group consisting of the naphthenates, 2-ethyl-hexoates, oleates, linoleates and tallates of vanadium, chromium, manganese, iron, cobalt and nickel in a nonpolar solvent.

References Cited in the file of this patent

UNITED STATES PATENTS 2,395,185   Isenberg _____ Feb. 19, 1946.